(12) United States Patent
Huang et al.

(10) Patent No.: US 12,518,481 B2
(45) Date of Patent: Jan. 6, 2026

(54) METHOD AND APPARATUS FOR CONSTRUCTING LARGE-SCALE URBAN POINT CLOUD DATASET AND EXTRACTING BUILDING INSTANCE

(71) Applicant: SHENZHEN UNIVERSITY, Guangdong (CN)

(72) Inventors: Hui Huang, Shenzhen (CN); Guoqing Yang, Shenzhen (CN); Fuyou Xue, Shenzhen (CN)

(73) Assignee: Shenzhen University, Shenzhen (CN)

( * ) Notice: Subject to any disclaimer, the term of this patent is extended or adjusted under 35 U.S.C. 154(b) by 135 days.

(21) Appl. No.: 18/410,515

(22) Filed: Jan. 11, 2024

(65) Prior Publication Data

US 2024/0386662 A1  Nov. 21, 2024

(30) Foreign Application Priority Data

May 15, 2023  (CN) .......................... 202310541020.9

(51) Int. Cl.
*G06T 17/00* (2006.01)
*G06V 10/44* (2022.01)

(52) U.S. Cl.
CPC .............. *G06T 17/00* (2013.01); *G06V 10/44* (2022.01)

(58) Field of Classification Search
None
See application file for complete search history.

(56) References Cited

U.S. PATENT DOCUMENTS

| 12,293,457 | B2 * | 5/2025 | Sun ........................ G06V 20/64 |
| 2021/0063578 | A1 * | 3/2021 | Wekel .................... G01S 17/894 |
| 2023/0206647 | A1 * | 6/2023 | Huang .................... G05D 1/027 |
| | | | 701/26 |

FOREIGN PATENT DOCUMENTS

| CN | 112712596 A | 4/2021 |
| CN | 113516135 A | 10/2021 |
| CN | 115619963 A | 1/2023 |

OTHER PUBLICATIONS

Office Action issued on Jun. 17, 2023, in corresponding Chinese Application No. 202310541020.9; 8 pages.
Office Action issued on Jul. 8, 2023, in corresponding Chinese Application No. 202310541020.9; 6 pages.
(Continued)

*Primary Examiner* — Frank S Chen
(74) *Attorney, Agent, or Firm* — Maier & Maier, PLLC

(57) ABSTRACT

A method and an apparatus for constructing large-scale urban point cloud dataset and extracting building instance. The method includes obtaining a point cloud feature corresponding to a target point cloud; determining a foreground semantic map, an instance perception feature, and a center offset vector corresponding to the target point cloud based on the point cloud feature; selecting a plurality of building candidate points from building foreground points in the foreground semantic map, determining a relational matrix between the building foreground points and the building candidate points based on the instance perception feature and the center offset vector, determining an instance tag of each building foreground point based on the relational matrix, and merging the instance tag to obtain a result of a building candidate instance; and scoring the result of the building candidate instance, and determining a result of a building instance based on the scoring.

8 Claims, 7 Drawing Sheets

(56) References Cited

OTHER PUBLICATIONS

Yang et al., "UrbanBIS: a Large-scale Benchmark for Fine-grained Urban Building Instance Segmentation", SIGGRAPH '23 Conference Proceedings, Aug. 6-10, 2023, Los Angeles, CA, USA; 11 pages.

Li et al., "Single Part of Building Extraction from Dense Matching Point Cloud", Chinese Journal of Lasers, Jul. 2018, vol. 45, No. 7; 8 pages.

\* cited by examiner

METHOD AND APPARATUS FOR CONSTRUCTING LARGE-SCALE URBAN POINT CLOUD DATASET AND EXTRACTING BUILDING INSTANCE

CROSS-REFERENCES TO RELATED APPLICATIONS

This application claims priority to Chinese Patent Application No. 202310541020.9, filed on May 15, 2023, the content of all of which is incorporated herein by reference.

FIELD

The present disclosure relates to the technical field of computer graphics, in particular to a method and an apparatus for constructing large-scale urban point cloud dataset and extracting building instance.

BACKGROUND

The technology of extracting building instance aims to obtain an independent single building from the whole input scene. The building instance extraction technology is one of the most basic problems in three-dimensional (3D) point cloud processing, and is further an important means to understand urban scenes.

Building instance extraction methods are mainly divided into two technical routes: top-to-down and bottom-to-up. Among them, the top-to-down method mainly first finds areas (3D bounding boxes) where objects are located by a target detection method, and then performs a semantic segmentation respectively in these areas to distinguish foreground and background points, and outputs each segmentation result of each bounding box as a different instance object: the bottom-to-up method first extracts point-by-point depth features, and then distinguishes different objects through clustering, metric learning, etc.

However, due to the immature application of object detection technology in 3D point cloud processing, the existing instance extraction technology of 3D point cloud generally focuses on the bottom-to-up design idea. However, the bottom-to-up method is to adopt point-by-point clustering to complete the instance of 3D point cloud. When facing the 3D point cloud data of outdoor scenes, due to that the data volume of the 3D point cloud data of outdoor scenes is very large, the operation of the point-by-point clustering is very time-consuming, which affects the time efficiency of the instance of 3D point cloud and reduces the speed of the instance of 3D point cloud.

Therefore, the prior art still needs to be improved.

SUMMARY

According to the deficiencies of the prior art, the present disclosure is to provide a method and an apparatus for constructing large-scale urban point cloud dataset and extracting building instance.

To solve the above-mentioned technical problem, the embodiments of the present disclosure, in a first aspect, provide a method for constructing large-scale urban point cloud dataset and extracting building instance, and the method includes steps of:

obtaining a point cloud feature corresponding to a target point cloud:
determining a foreground semantic map, an instance perception feature, and a center offset vector based on the point cloud feature: the foreground semantic map, the instance perception feature, and the center offset vector correspond to the target point cloud:

selecting a plurality of building candidate points from building points in the foreground semantic map, determining a relational matrix between the building foreground points and the building candidate points based on the instance perception feature and the center offset vector, determining an instance tag of each building foreground point based on the relational matrix, and merging the instance tag to obtain a result of a building candidate instance; and scoring the result of the building candidate instance, and determining a result of a building instance based on the scoring.

In some embodiments, the step of determining the relational matrix between the building foreground points and the building candidate points based on the instance perception feature and the center offset vector includes steps of:

determining a target instance perception feature and a center offset feature of each building foreground point based on the instance perception feature and the center offset vector, and determining a foreground feature of each building foreground point based on the target instance perception feature and the center offset feature of each building foreground point: and calculating a feature distance between each building foreground point and each building candidate point based on the foreground feature of each building foreground point, and forming the relational matrix based on the calculated feature distance.

In some embodiments, a first quantity of the plurality of the building candidate points is determined based on a second quantity of the building foreground points, and the first quantity is less than the second quantity.

In some embodiments, the step of merging the instance tag to obtain the result of the building candidate instance includes steps of:

adjusting a location information of each building candidate point based on the center offset vector to obtain a target location information of each building candidate point:

calculating a building distance between any two building candidate points in the plurality of the building candidate points based on the target location information of each building candidate point, and merging the plurality of the building candidate points based on the building distance to obtain a building target pointset: and mapping the instance tag of each building foreground point to a target instance tag set corresponding to the building target pointset to obtain the result of the building candidate instance.

In some embodiments, the method applies a trained building point cloud instance extraction network model, the network model includes a feature extraction module, a semantic branch, an instance perception branch, a center offset branch, a building candidate generation module, and a building score prediction module: the semantic branch, the instance perception branch, and the center offset branch are concurrent; the feature extraction module is connected with the semantic branch, the instance perception branch, and the center offset branch: the semantic branch, the instance perception branch, and the center offset branch are all connected with the building candidate generation module: the building candidate generation module is connected with the building score prediction module: and the building candidate generation module includes a building candidate point selecting unit, a building grouping unit, and a building merging unit.

In some embodiments, a large-scale urban point cloud dataset corresponding to the building point cloud instance extraction network model includes a plurality of large-scale urban point clouds; each three-dimensional point in each large-scale urban point cloud includes nine dimensions of three spatial coordinates, three color values, a semantic category, an instance number, and a building subclassification category.

In some embodiments, the semantic category includes a ground category, a vegetation category, a water surface category, a car category, a ship category, a bridge category, and a building category: the building subclassification category includes a commercial building category, a residential building category, an office building category, a cultural building category, a transportation building category, a municipal building category, and a temporary building category.

The embodiments of the present disclosure, in a second aspect, provide an apparatus for constructing large-scale urban point cloud dataset and extracting building instance, and the apparatus includes:

a feature extraction module, configured to obtain a point cloud feature corresponding to a target point cloud:

a collection module, configured to determine a foreground semantic map, an instance perception feature, and a center offset vector based on the point cloud feature, and the foreground semantic map, the instance perception feature, and the center offset vector correspond to the target point cloud:

a building candidate generation module, configured to select a plurality of building candidate points from building foreground points in the foreground semantic map, determine a relational matrix between the building foreground points and the building candidate points based on the instance perception feature and the center offset vector, determine an instance tag of each building foreground point based on the relational matrix, and merge the instance tag to obtain a result of a building candidate instance; and a building score prediction module, configured to score the result of the building candidate instance, and determine a result of a building instance based on the score.

The embodiments of the present disclosure, in a third aspect, provide a computer-readable storage medium, and the computer-readable storage medium stores one or more programs, and the one or more programs may be executed by one or more processors to implement the steps in the above-mentioned method for constructing large-scale urban point cloud dataset and extracting building instance.

The embodiments of the present disclosure, in a fourth aspect, provide a terminal device, and the terminal device includes a processor, a memory, and a communication bus:

a computer-readable program executable by the processor is stored in the memory:

the communication bus implements a connection and communication between the processor and the memory:

when the processor executes the computer-readable program, the steps in the above-mentioned method for constructing large-scale urban point cloud dataset and extracting building instance are implemented.

Beneficial effects of the present disclosure: comparing with the prior art, the present disclosure provides a method and an apparatus for constructing large-scale urban point cloud dataset and extracting building instance. The method includes steps of obtaining a point cloud feature corresponding to a target point cloud: determining a foreground semantic map, an instance perception feature, and a center offset vector based on the point cloud feature: the foreground semantic map, the instance perception feature, and the center offset vector correspond to the target point cloud: selecting a plurality of building candidate points from building foreground points in the foreground semantic map, determining a relational matrix between the building foreground points and the building candidate points based on the instance perception feature and the center offset vector, determining an instance tag of each building foreground point based on the relational matrix, and merging the instance tag to obtain a result of a building candidate instance; and scoring the result of the building candidate instance, and determining a result of a building instance based on the scoring. In the embodiments of the present disclosure, partial building foreground points are selected as building candidate points, and then a relational matrix between the building foreground points and the building candidate points is established, and then an instance tag of each building foreground point is determined based on the relational matrix, so that the time-consuming point-by-point clustering process can be removed, and the accuracy and speed of 3D point cloud building instance can be improved.

BRIEF DESCRIPTION OF THE DRAWINGS

In order to more clearly illustrate the technical solutions of the embodiments of the present disclosure, the drawings required to be used in the embodiments are briefly introduced below. Obviously, the following drawings only show some embodiments of the present disclosure. For those ordinary skilled in the art, other relevant drawings can be obtained based on these drawings without any creative efforts.

DETAILED DESCRIPTION OF EMBODIMENTS

Figure 1:
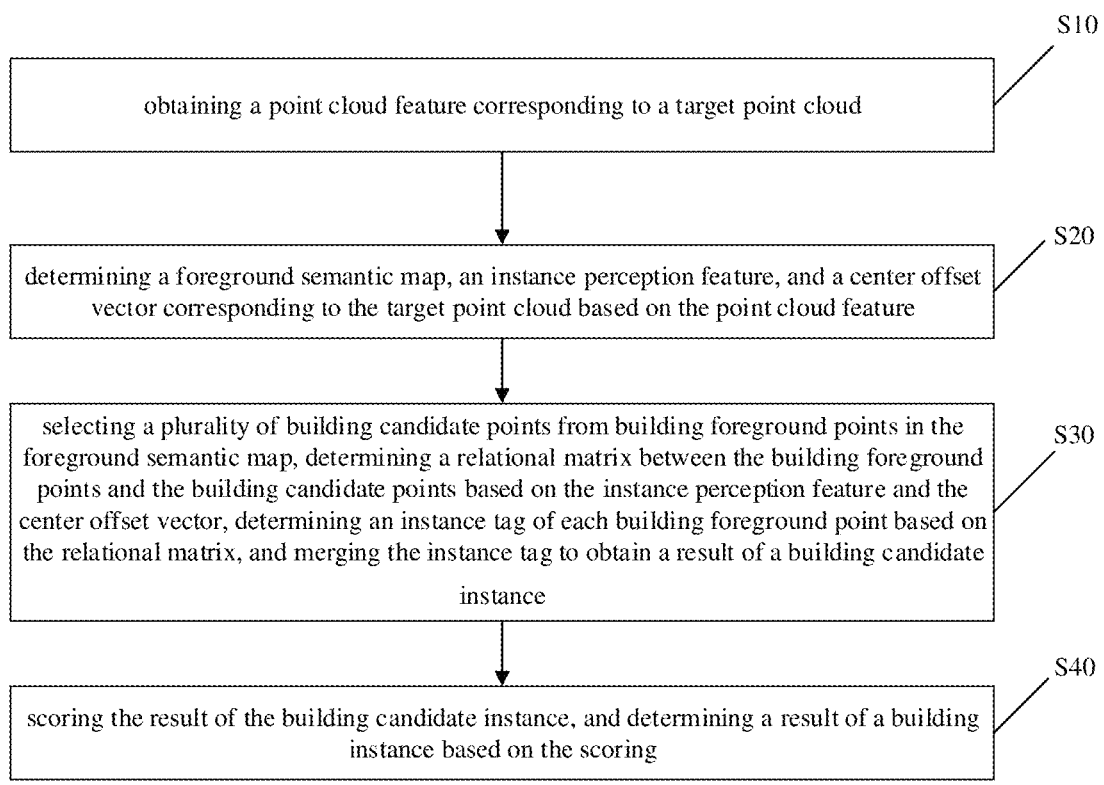
FIG. 1 is a flow chart of a method for constructing large-scale urban point cloud dataset and extracting building instance provided by the present disclosure.

The present disclosure provides a method and an apparatus for constructing large-scale urban point cloud dataset and extracting building instance. In order to make the purposes, technical solutions and advantages of the present disclosure clearer and more explicit, the following is a further detailed description of the present disclosure with reference to the accompanying drawings. It should be understood that the specific embodiments described here are only used to explain the present disclosure, not to limit the present disclosure.

Those skilled in the art can understand that, unless otherwise stated, the singular forms "a", "an", "said", and "the" used herein may also include plural forms. It should be further understood that the words "include", and "comprise" used in the specification of the present disclosure refers to the presence of the features, integers, steps, operations, elements and/or components, but does not exclude the presence or addition of one or more other features, integers, steps, operations, elements, components, and/or groups thereof. It should be understood that when an element is referred to as being "connected" or "coupled" to another element, the element may be directly connected or coupled to the other element or an intervening element may also be present. Additionally, "connected" or "coupled" as used herein may include wireless connection or wireless coupling. The expression "and/or" used herein includes all or any one of units and all combinations of one or more associated listed items.

Those skilled in the art can understand that, unless otherwise defined, all terms (including technical terms and scientific terms) used herein have the same meanings as commonly understood by those ordinary skilled in the art to which the present disclosure belongs. It should be further understood that terms, such as those defined in commonly used dictionaries, should be understood to have meanings consistent with their meanings in the context of the prior art, and unless specifically defined as herein, are not intended to be explained by idealized or overly formal meanings.

It should be understood that the sequence numerals and the sizes thereof of the steps in the present embodiments do not imply the execution order. And the execution order of each process is determined by its function and internal logic, and should not constitute any limitation to the implementation process of the embodiments of the present disclosure.

After research, it is found that point cloud is one of the three-dimensional (3D) representations of an object, the point cloud may be obtained directly through sensors such as lidar, 3D scanner, etc., or indirectly through binocular camera, multi-view geometry, etc. In recent years, with the rapid development of Unmanned Aerial Vehicle (UAV) multi-view stereo geometry reconstruction research for large-scale urban scenes, 3D point cloud models of urban-scene level can be easily obtained. Buildings are the most common and important components of urban scenes. However, due to the lack of understanding of the semantic information of buildings, it is difficult for 3D point cloud models to be directly used in specific applications such as urban twinning, urban modeling, urban planning, etc. Therefore, an understanding of the semantic information of buildings becomes a key technology for applying 3D point cloud models to specific applications such as urban twinning, urban modeling, urban planning, etc.

The technology of extracting building instance aims to obtain an independent single building segmentation result. The technology is one of the most basic problems in three-dimensional (3D) point cloud processing and is further an important means to understand urban scenes. Building instance extraction methods are mainly divided into two technical routes: top-to-down and bottom-to-up. Among them, the top-to-down method mainly first finds areas (3D bounding boxes) where objects are located through a target detection method, and then performs a semantic segmentation respectively in these areas to distinguish foreground and background points, and outputs each segmentation result of each bounding box as a different instance object; the bottom-to-up method first extracts point-by-point depth features, and then distinguishes different objects through clustering, metric learning, etc.

However, due to the immature application of object detection technology in 3D point cloud processing, the existing instance extraction technology of 3D point cloud generally focuses on the bottom-to-up design idea. However, the bottom-to-up method is to adopt point-by-point clustering to complete the instance of 3D point cloud. When facing the 3D point cloud data of outdoor scenes, due to that the data volume of the 3D point cloud data of outdoor scenes is very large, the operation of the point-by-point clustering is very time-consuming, which affects the time efficiency of the instance of 3D point cloud and reduces the speed of the instance of 3D point cloud.

In order to solve the above problems, in the embodiments of the present disclosure, a method includes steps of: obtaining a point cloud feature corresponding to a target point cloud: determining a foreground semantic map, an instance perception feature, and a center offset vector based on the point cloud feature: the foreground semantic map, the instance perception feature, and the center offset vector correspond to the target point cloud: selecting a plurality of building candidate points from building foreground points in the foreground semantic map, determining a relational matrix between the building foreground points and the building candidate points based on the instance perception feature and the center offset vector, determining an instance tag of each building foreground point based on the relational matrix, and merging the instance tag to obtain a result of a building candidate instance; and scoring the result of the building candidate instance, and determining a result of a building instance based on the scoring. In the present embodiments of the present disclosure, partial building foreground points are selected as building candidate points, and then a relational matrix between the building foreground points and the building candidate points is established, and then an instance tag of each building foreground point is determined based on the relational matrix, so that the time-consuming point-by-point clustering process can be removed, and the accuracy and speed of 3D point cloud building instance extraction method can be improved.

The content of the present disclosure is further explained by describing the embodiments below in conjunction with the accompanying drawings.

The present embodiment provides a method for constructing large-scale urban point cloud dataset and extracting building instance, which may be applied in the fields of urban twinning, urban modeling, urban planning, and etc. As shown in FIG. 1, the method includes following steps.

S10, obtaining a point cloud feature corresponding to a target point cloud.

In some embodiments, the target point cloud is point-cloud data obtained under a large-scale urban scene, for example, the target point cloud may be point-cloud data obtained by collecting a large-scale urban scene in multiple views by the UAV. Certainly, the target point cloud may be point-cloud data obtained by collecting a large-scale urban scene through the lidar, the binocular camera, etc. Among them, each 3D point in the target point cloud includes six-dimensional (6D) information of 3D coordinates xyz and colors rgb.

Figure 2:
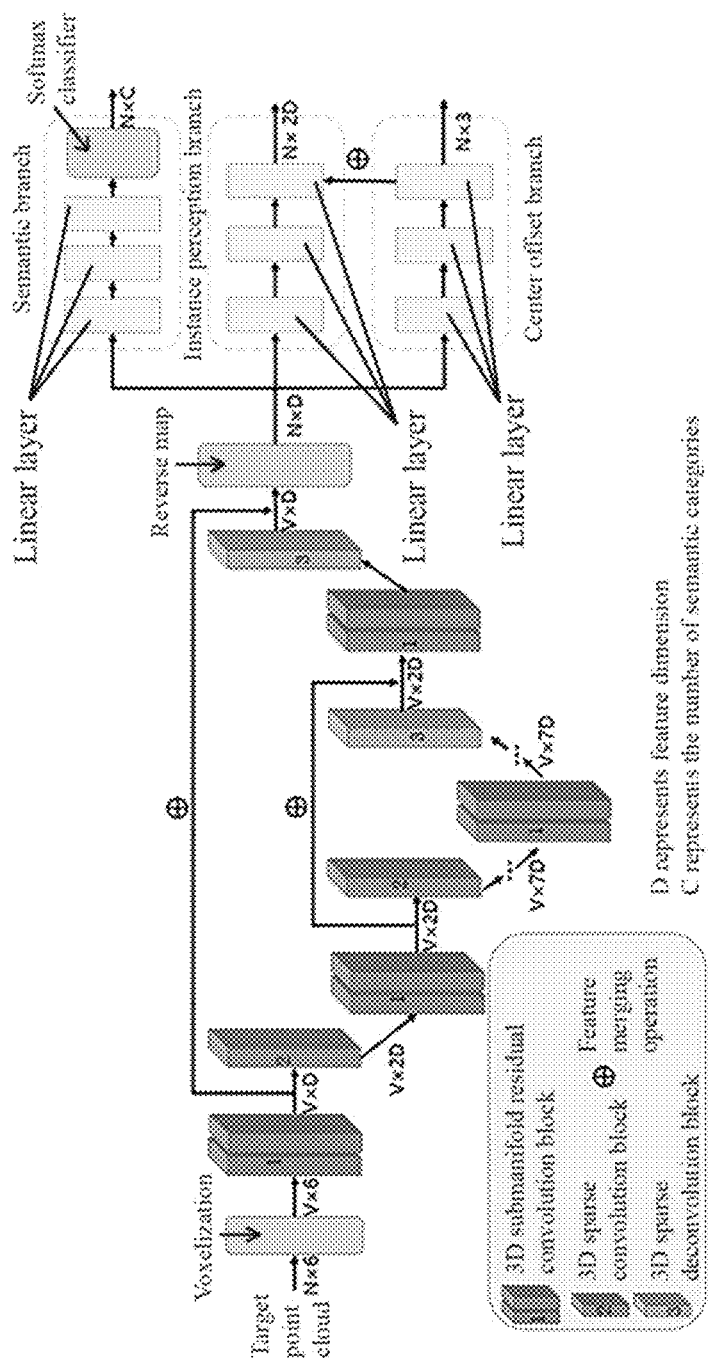
FIG. 2 is a schematic diagram of structures of a feature extraction module, a semantic branch, an instance perception branch and a center offset branch provided by the present disclosure.

The point cloud feature is obtained by operating a feature extraction on the target point cloud. Among them, the point cloud feature may be a point-by-point high-dimensional feature obtained by operating a feature learning on the target point cloud through a deep learning network model. In the present embodiment, the point cloud feature may be extracted by a feature extraction module, among them, the feature extraction module may use a U-shaped network (3D-UNet) composed of sparse convolution modules stacking together. As shown in FIG. 2, the feature extraction module includes voxelization layer, 3D submanifold residual convolution block a1, 3D submanifold residual convolution block a2, 3D submanifold residual convolution block a3, 3D submanifold residual convolution block a4, 3D sparse convolution block b1, 3D sparse convolution block b2, 3D sparse deconvolution block c1, 3D sparse deconvolution block c2 and reflection layer. The voxelization layer is connected to the 3D submanifold residual convolution block a1. The 3D submanifold residual convolution block a1 is connected to the 3D sparse convolution block b1, and the reflection layer respectively. The 3D sparse convolution block b1 is connected to the 3D submanifold residual convolution block a2. The 3D submanifold residual convolution block a2 is connected to the 3D sparse convolution block b2, and the 3D submanifold residual convolution block a4 respectively. The 3D sparse convolution block b2 is connected to the 3D submanifold residual convolution block a3. The 3D submanifold residual convolution block a3 is connected to the 3D sparse deconvolution block c1. The 3D sparse deconvolution block c1 is connected to the 3D submanifold residual convolution block a4. The 3D submanifold residual convolution block a4 is connected to the 3D sparse deconvolution block c2. The 3D sparse deconvolution block c2 is connected to the reflection layer. Among them, an output item of the 3D sparse deconvolution block c2 and an output item of the 3D submanifold residual convolution block a1 after feature merging are used as an input item of the reflection layer, and an output item of the 3D submanifold residual convolution block a2 and an output item of the 3D sparse deconvolution block c1 after feature merging are used as an input item of the 3D submanifold residual convolution block a4.

S20, determining a foreground semantic map, an instance perception feature, and a center offset vector corresponding to the target point cloud based on the point cloud feature.

In some embodiments, the foreground semantic map is used to reflect a semantic category of each 3D point in the target point cloud, where the semantic category includes a foreground point included by the building, and a background point not included by the building. The instance perception feature is formed by mapping the point cloud feature to an instance-embedding space, and the center offset vector is used to reflect an offset between the foreground point of the building and the center of the building. In one implementation, the semantic foreground map may be determined by a semantic branch, the instance perception feature may be determined by an instance perception branch, and the center offset vector may be determined by a center offset branch. Among them, the semantic branch, the instance perception branch and the center offset branch are concurrent, and an input item of the semantic branch, an input item of the instance perception branch and an input item of the center offset branch are all the point cloud feature.

As shown in FIG. 2, the semantic branch includes a multi-layer perceptron composed of three linear layers and further includes a softmax classifier. A probability distribution prediction of each 3D point for C semantic categories is determined by the multi-layer perceptron and the softmax classifier, and the category with the highest probability is taken as a predicted semantic category of the point to obtain the semantic category of each 3D point in the target point cloud, among them, the semantic category is used to distinguish the foreground point included by the building and the background point not included by the building in the target point cloud. The instance perception branch may include a multi-layer perception mechanism composed of three linear layers: through the multi-layer perception mechanism, a feature of each 3D point is mapped to an instance-embedding space to obtain the instance perception feature, among them, in the instance embedding space, a feature distance between points of the same building is as small as possible and a feature distance between points of different buildings is as large as possible, so it is easier to distinguish different buildings. The center offset branch may include a multi-layer perception mechanism composed of three linear layers: through the multi-layer perception mechanism, the 3D center offset vector of each point towards a center of the building corresponding to each point is determined: through the center offset vector, a building candidate point can be moved to the center of the building, enabling better building merging.

S30, selecting a plurality of building candidate points from the building foreground points in the foreground semantic map, and determining a relational matrix between the building foreground point and the candidate building point based on the instance perception feature and the center offset vector, determining an instance tag of each building foreground point based on the relational matrix, and merging the instance tag to obtain a result of building candidate instance.

Figure 3:
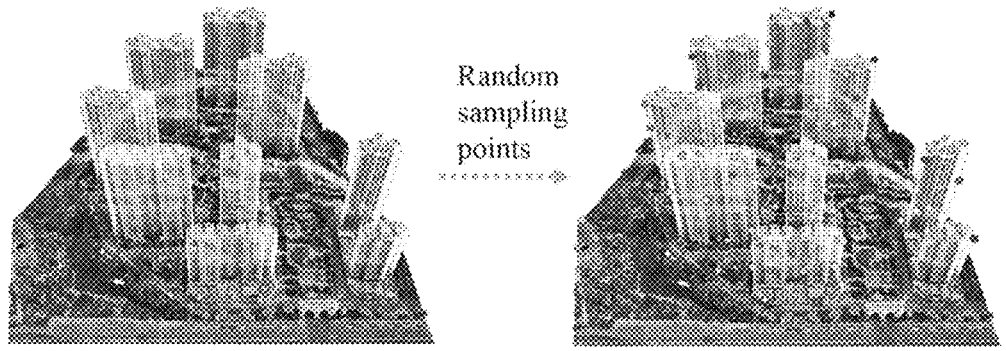
FIG. 3 is a schematic diagram of building candidate selecting.

In some embodiments, each building candidate point in the plurality of building candidate points is a building foreground point, that is, all building foreground points are determined based on the foreground semantic map, and then partial building foreground points are selected from all building foreground points, the partial building foreground points are used as building candidate points. For example, as shown in FIG. 3, the circular points in the figure are the selected building candidate points. In addition, the number of the plurality of building candidate points may be preset, or may be determined according to the 3D point included by the target point cloud.

In one implementation, since the number of 3D points included by the target point cloud collected by different urban scenes is different, correspondingly, the number of building foreground points in the target point cloud is also different, so in the present implementation, the number of building candidate points is determined based on the number of building foreground points. That is to say, the first number of the plurality of building candidate points is determined based on the second number of the building foreground points, and the first number is smaller than the second number. For example, the first number K is ⅓₀₀₀ of the second number N, that is, K=N/3000, one building candidate point is selected for every 3000 building foreground points. Accordingly, a specific process of selecting a plurality of building candidate points from the building foreground points in the foreground semantic map may be: determining the first number of building candidate points based on the second number of building foreground points, and then randomly selecting the first number of building foreground points from all the building foreground points as building candidate points.

Furthermore, after obtaining the plurality of building candidate points, using each building candidate point in the plurality of building candidate points as a building instance tag, and then assigning each building instance tag to other remaining building foreground points to obtain the instance tag of each building foreground point. Among them, in the process of assigning each building instance tag to other remaining building foreground points, the relational matrix between the building foreground points and the building candidate points may be determined based on the instance perception feature and the center offset vector, and then the building candidate point corresponding to each building foreground point is determining based on the relational matrix.

The relational matrix is used to reflect a relational belong-to degree of the building foreground point and the building candidate point both belonging to the same building. That is, a matrix dimension of the relational matrix is N*K, N represents the second number of the building foreground points, and K represents the first number of the building candidate points, each matrix element in the relational matrix represents a belong-to degree of a relationship between a building foreground point and a building candidate point. Among them, the smaller the belong-to degree of the relationship, the greater the probability of the building foreground point and the building candidate point both belonging to the same building, and the greater the belong-to degree of the relationship, the smaller the probability of the building foreground point and the building candidate point both belonging to the same building. Therefore, based on the relational matrix, the building candidate point corresponding to each building foreground point can be determined, so that the instance tag of each building foreground point can be determined.

Figure 4:
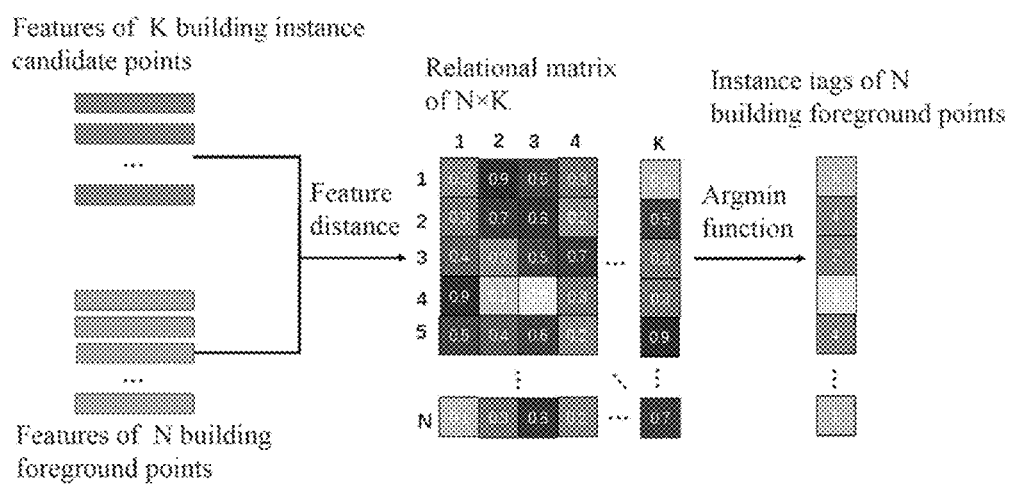
FIG. 4 is a schematic diagram of building grouping.

In one implementation, as shown in FIG. 4, the step of determining the relational matrix between the building foreground point and the building candidate point based on the instance perception feature and the center offset vector includes following steps.

S311, determining a target instance perception feature and a center offset feature of each building foreground point based on the instance perception feature and the center offset vector, and determining a foreground feature of each building foreground point based on the target instance perception feature and the center offset feature of each building foreground point.

S312, calculating a feature distance between each building foreground point and each building candidate point based on the foreground feature of each building foreground point, and forming a relational matrix based on all the calculated feature distances.

In some embodiments, the instance perception feature includes a target instance perception feature of each building foreground point, and the center offset includes a center offset feature of each building foreground point, so that based on the target instance perception feature and the center offset feature of each building foreground point, the foreground feature of each building foreground point can be determined. Among them, the foreground feature may be obtained by merging the target instance perception feature and the center offset feature, and a merging order may be the target instance perception feature—the center offset feature, or the center offset feature—the target instance perception feature.

After obtaining the foreground feature of each building foreground point, since the building candidate point is also building foreground point, the foreground feature of each building candidate point is also obtained. Therefore, a feature distance between each building foreground point and each building candidate point can be calculated based on the foreground feature of each building foreground point and the foreground feature of each building candidate point, and the feature distance can be expressed as:

$$d_{ij} = \|f_i - f_j\|_2$$

among them, $i \in (1, N)$, $j \in (1, K)$, N represents the first number of building foreground points, K represents the second number of building candidate points, $f_i$ represents the foreground feature of the ith building foreground point, and $f_j$ represents the foreground feature of the jth building candidate point.

Furthermore, since each matrix element in the relational matrix is based on the feature distance calculated by the instance perception feature and the center offset vector, the instance perception feature has a characteristic of the feature distance is short within the same building and is long between different buildings, so $M_{ij}$ in the relational matrix describes a belong-to degree of a relationship between the ith building candidate point and the jth building foreground point both belonging to the same building. That is, if the value of $M_{ij}$ is smaller, it means that a probability of the jth point belonging to the building candidate is bigger. Accordingly, for each building foreground point, the building candidate with the smallest feature distance is selected as an instance tag, where the instance tag of the building foreground point may be expressed as:

$$l_i = \mathrm{argmin}(M_i)$$

among them, $M_i$ represents the ith row of the relational matrix, and $l_i$ represents the instance tag of the ith building foreground point.

In one implementation, since the first number of building candidate points is greater than the number of buildings in the urban scene corresponding to the target point cloud, it causes that the same building is covered with multiple building candidate points, then after the instance tag corresponding to each building foreground point is determined based on the relational matrix, the same building is divided into multiple regions, that is, the same building has multiple instance tags. Therefore, when determining the instance tag of each building foreground point based on the relational matrix, after the instance tag of each building foreground point is determined, the instance tags can be merged to remove redundant tags.

Figure 5:
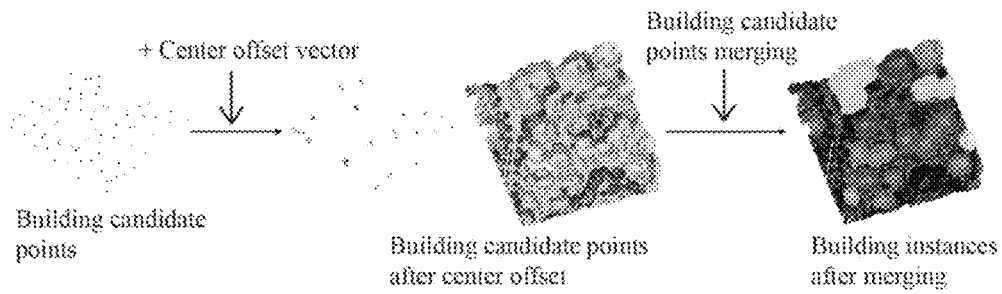
FIG. 5 is a schematic diagram of building merging.

Accordingly, as shown in FIG. 5, the step of merging the instance tags to obtain the result of candidate building instance includes following steps.

S321, adjusting a location information of each building candidate point based on the center offset vector to obtain a target location information corresponding to each building candidate point:

S322, calculating a building distance between any two building candidate points among the plurality of building candidate points based on the target location information of each building candidate point, and merging the plurality of building candidate points based on the building distance to obtain a building target point set:

S323, mapping the instance tag of each building foreground point to a target instance tag set corresponding to the building target pointset to obtain a result of candidate building instance.

In some embodiments, the location information refers to 3D coordinates of the building candidate point, and the target location information refers to adjusted 3D coordinates based on the center offset vector. Among them, since the center offset vector is used to make the building candidate point move to the building center, the 3D coordinates of the building candidate point are adjusted by the center offset, which may make the building candidate points belonging to the same building gather in a certain spatial extension, and enlarge a distance between the building candidate points belonging to different buildings. In the present embodiment, adjusting the location information of each building candidate point based on the center offset vector may be to add the center offset feature corresponding to the building candidate point to the building candidate point, among them, the center offset feature is a 3D vector, including x-direction offset, y-direction offset and z-direction offset respectively.

Building distance refers to a distance between the 3D coordinates of one building candidate point and the 3D coordinates of another one building candidate point. For example, the building distance between two building candidate points may be determined by calculating Euclidean distance between the 3D coordinates of one building candidate point and the 3D coordinates of another one building candidate point. After the building distance is obtained, the building distance may be compared with a preset distance threshold. When the building distance is less than the preset distance threshold, the two building candidate points belong to the same building and both are merged: when the building distance is greater than or equal to the preset distance threshold, the two building points do not belong to the same building. Among them, the preset distance threshold is preset and, for example, 10 m.

In the present embodiment, by merging multiple building candidate points, and then merging the building foreground points based on the correspondence between the building foreground point and the building candidate point, a calculation amount required for merging the instance tags can be reduced, thereby a speed of building instance extraction method can be increased. This is because the building candidate points is part of the building foreground points, and the number of the building candidate points is much smaller than the number of the building foreground points.

In one implementation, the result of extracting building instance may be determined by a building candidate generation module. The building candidate generation module includes a building candidate point selecting unit, a building grouping unit and a building merging unit. Among them, the building candidate point selecting unit is used to select multiple building candidate points from the building foreground points in the foreground semantic map. The building grouping unit is used to determine the relational matrix between building foreground points and candidate building points based on the instance perception feature and the center offset vector, and determine the instance tag of each building foreground point based on the relational matrix. The building merging unit is used to merge the instance tags to obtain the result of candidate building instance.

S40, scoring the result of candidate building instance, and determining a result of building instance based on the scoring.

In some embodiments, each candidate building instance tag in the result of candidate building instance corresponds to a score, and the score is used for an authenticity of the candidate building instance tag. Among them, the higher the score, the higher the authenticity of the candidate building instance tag: and the lower the score, the lower the authenticity of the candidate building instance tag. Thus, after the score of each candidate building instance tag is obtained, the candidate building instance tags may be filtered based on the score, and the filtered candidate building instance tags can be used as the result of building instance, thereby filtering out false candidate buildings, so as to improve an accuracy of the result of extracting building instance. Among them, a scoring process may be performed by a building score prediction module, and the score of each building instance tag is predicted by the building score prediction module, and the result of building instance based on the score is output.

In the present embodiment, the method for constructing large-scale urban point cloud dataset and extracting building instance may applies a trained building point cloud instance network model, and a process of the method can be executed by the trained building point cloud instance network model. The method for constructing large-scale urban point cloud dataset and extracting building instance may also be inherited as a functional module, by running this functional module to run the method for constructing large-scale urban point cloud dataset and extracting building instance.

Figure 6:
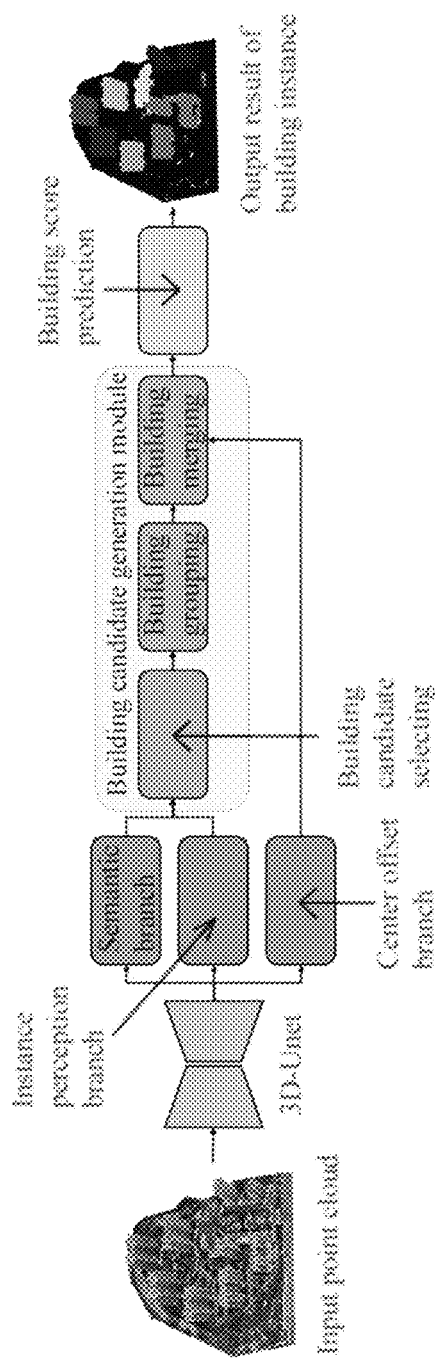
FIG. 6 is a schematic diagram of a structure of a network model of a building point cloud instance extraction.

In one implementation, the process of the method is executed by using the building point cloud instance extraction network model. As shown in FIG. 6, the network model includes a feature extraction module, a semantic branch, an instance perception branch, a center offset branch, a building candidate generation module and a building score prediction module: the semantic branch, the instance perception branch, and the center offset branch are concurrent. The feature extraction module is respectively connected with the semantic branch, the instance perception branch and the center offset branch. The semantic branch, the instance perception branch and the center offset branch are all connected with the building candidate generation module. The building candidate generation module is connected with the building score prediction module. Among them, the building candidate generation module includes a building candidate point selecting unit, a building grouping unit and a building merging unit. In addition, a network structure and an execution process of each network module in the building point cloud instance extraction network model are described in the implementation process of the above methods, and are not repeated here.

Furthermore, the building point cloud instance extraction network model is obtained based on training and testing the large-scale urban point cloud dataset. Among them, the large-scale urban point cloud dataset includes multiple large-scale urban point clouds, and each 3D point in each large-scale urban point cloud includes nine dimensions, the nine dimensions are three spatial coordinates, three color values, semantic category, instance number, and building subclassifying category. Among them, the large-scale urban may be a city whose population exceeds a predicted population threshold, or a city whose land area exceeds a preset land area threshold, etc. The large-scale urban point cloud data may be formed by collecting the entire city, or by collecting each administrative district in the city.

In some embodiments, the large-scale urban point cloud dataset includes point cloud data of three cities with different development levels, and an area difference between collection areas corresponding to the point cloud data of the three cities with different development levels is smaller than a preset area difference threshold, that is to say, the area of the collection areas corresponding to the point cloud data of the three cities with different development levels are basically the same. In addition, for cities with different development levels, at least two regional scenes are selected for collecting point cloud data, that is, the large-scale urban point cloud data includes point cloud data of two regional scenes, for example, point cloud data including a campus scene and point cloud data including a resident scene. In this way, by collecting from two regional scenes, data types of the large-scale urban point cloud dataset can be enriched.

Figure 7:
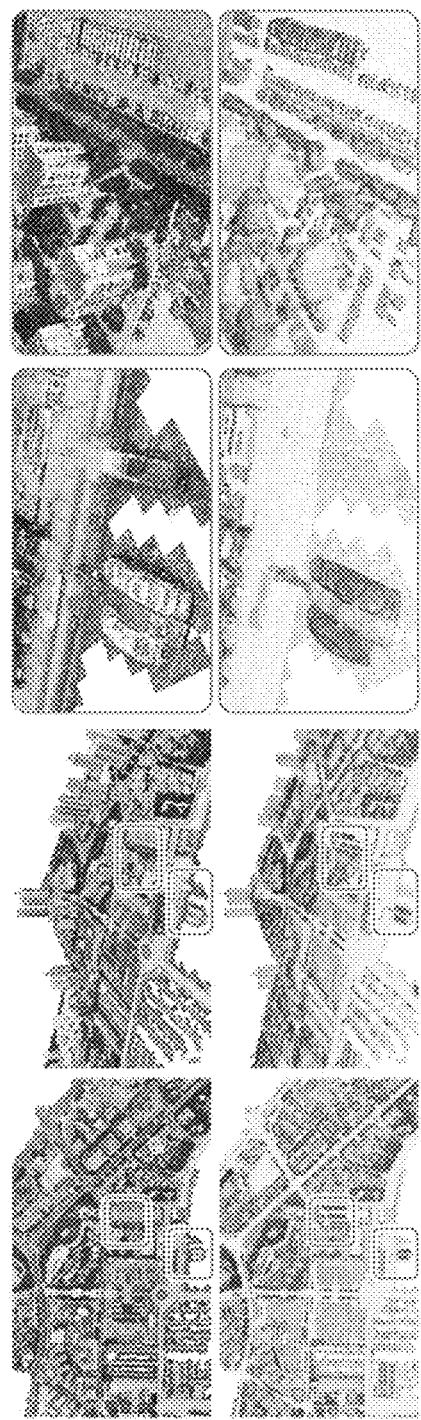
FIG. 7 is a schematic diagram of a scene semantic category classification.

Furthermore, the semantic category may include a ground category, a vegetation category, a water surface category, a car category, a ship category, a bridge category, and a building category. For example, as shown in FIG. 7, each large-scale urban point cloud data is divided into scene semantic categories, and each of the divided scene semantic categories is marked. In the present embodiment, point cloud data of Qingdao, Wuhu, Shenzhen Longhua District, Shenzhen Yuehai Street, Lihu and Yingrenshi are collected and semantically divided to obtain point cloud data under different categories as shown in Table 1.

TABLE 1 the number of point clouds in scene categories.

| Categories | Qingdao | Wuhu | Shenzhen Longhua District | Shenzhen Yuehai Street | Lihu | Yingrenshi |
|---|---|---|---|---|---|---|
| Building | 269.6M | 285.3M | 256.4M | 118.0M | 68.2M | 15.0M |
| Ground | 114.2M | 132.3M | 158.6M | 69.6M | 80.5M | 4.4M |
| Water surface | 11.5M | 21.0M | 0.3M | 3.9M | 2.5M | 0 |
| Ship | 4.2M | 409 | 852 | 0 | 2490 | 0 |
| Vegetation | 179.5M | 175.7M | 225.5M | 197.8M | 104.1M | 1.7M |
| Car | 15.1M | 8.2M | 11.4M | 1.2M | 2.1M | 0.9M |
| Bridge | 37074 | 1.6M | 1.8M | 2.9M | 0.8M | 0.4M |

Figure 8:
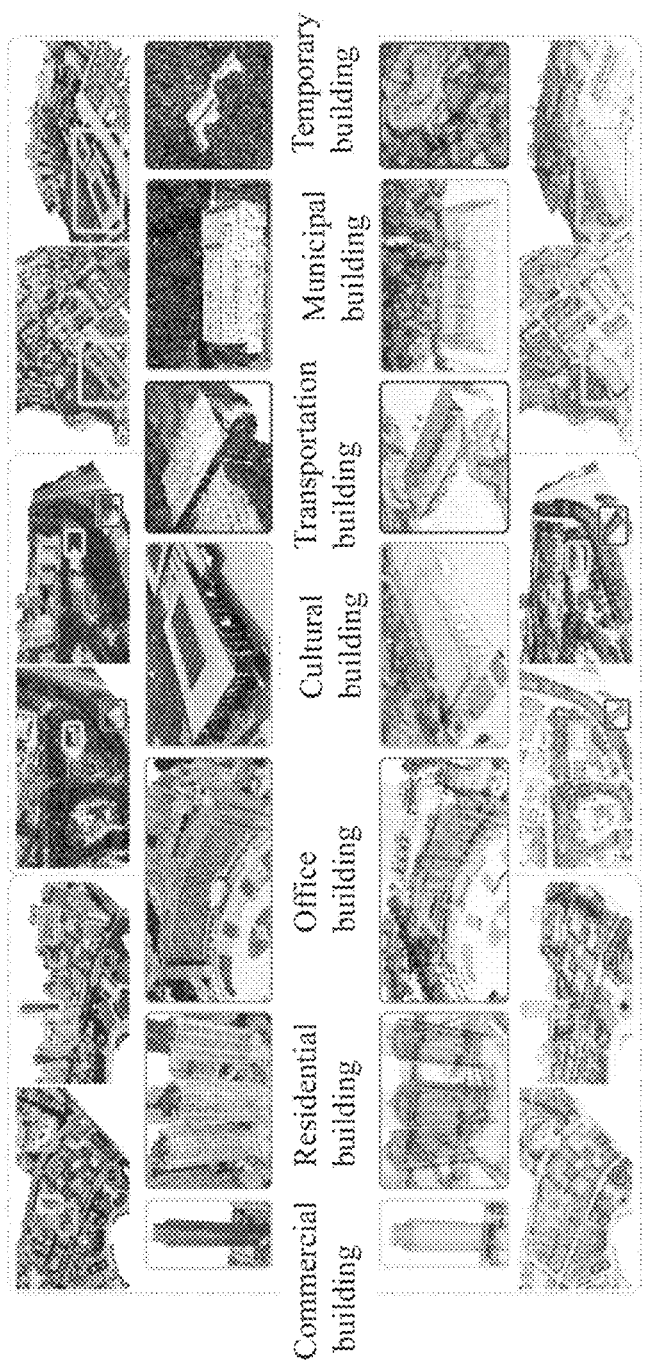
FIG. 8 is a schematic diagram of a building subclassification.

Furthermore, types of urban scenes are very rich and diverse, and topographic features of urban scenes are related to geographical location and economic development level. The distribution of buildings is the most intuitive basis for describing urban scenes. According to the different urban development levels, the distribution of typical buildings of urban scenes is also different. Therefore, building type is further classified to form a building subclassification category. Among them, the building subclassification category includes a commercial building category, a residential building category, an office building category, a cultural building category, a transportation building categories, a municipal building category, and a temporary building category. According to the method of manual confirmation and the specific building use, the building subclassification category is marked. The typical buildings in whole scene are shown in FIG. 8. In addition, the number of different categories of buildings is counted for different scenes, as shown in Table 2 below.

TABLE 2 the number of different categories of buildings in scenes.

| Categories | commercial | residential | office | cultura | transportation | municipal | temporary |
|---|---|---|---|---|---|---|---|
| Qingdao | 64 | 238 | 26 | 8 | 18 | 106 | 124 |
| Wuhu | 24 | 813 | 32 | 7 | 0 | 47 | 117 |
| Shenzhen Longhua District | 7 | 55 | 39 | 16 | 1 | 12 | 114 |
| Shenzhen Yuehai Street | 1 | 14 | 26 | 7 | 4 | 44 | 211 |
| Lihu | 12 | 274 | 96 | 1 | 17 | 111 | 454 |
| Yingrenshi | 3 | 11 | 10 | 0 | 0 | 4 | 6 |

Furthermore, after the large-scale urban point cloud dataset is obtained, the large-scale urban point cloud dataset is cut to form a training dataset and a test dataset, among them, an integrity of building must be guaranteed during the cutting process, so buildings are divided along streets, so as to obtain the data available for training. A specific division number is shown in Table 3 below.

TABLE 3 count of dataset division.

| Scenes | Training | Validating | Testing |
|---|---|---|---|
| Qingdao | 20 | 6 | 10 |
| Wuhu | 26 | 13 | 13 |
| Shenzhen Longhua District | 24 | 12 | 12 |
| Shenzhen Yuehai Street | 19 | 4 | 6 |

TABLE 3-continued count of dataset division.

| Scenes | Training | Validating | Testing |
|---|---|---|---|
| Lihu | 17 | 4 | 5 |
| Yingrenshi | 0 | 0 | 1 |

In summary, the present embodiments provide a method for constructing large-scale urban point cloud dataset and extracting building instance, the method includes steps of: obtaining a point cloud feature corresponding to a target point cloud; determining a foreground semantic map, an instance perception feature, and a center offset vector based on the point cloud feature; the foreground semantic map, the instance perception feature, and the center offset vector correspond to the target point cloud; selecting a plurality of building candidate points from building foreground points in the foreground semantic map, determining a relational matrix between the building foreground points and the building candidate points based on the instance perception feature and the center offset vector, determining an instance tag of each building foreground point based on the relational matrix, and merging the instance tag to obtain a result of a building candidate instance; and scoring the result of the building candidate instance, and determining a result of a building instance based on the scoring. In the present embodiments of the present disclosure, partial building foreground points are selected as building candidate points, and then a relational matrix between the building foreground points and the building candidate points is established, and then an instance tag of each building foreground point is determined based on the relational matrix, so that the time-consuming point-by-point clustering process can be removed, and the accuracy and speed of 3D point cloud building instance extraction method can be improved.

Figure 9:
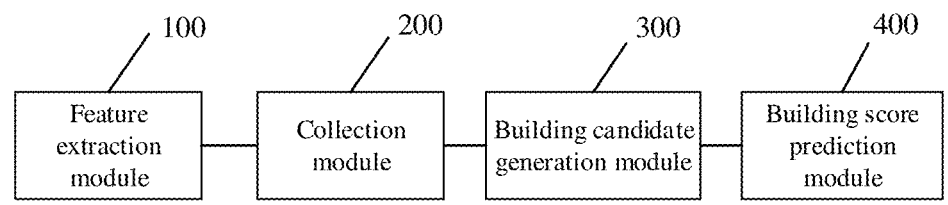
FIG. 9 is a schematic diagram of an apparatus for constructing large-scale urban point cloud dataset and extracting building instance.

Based on the above-mentioned method for constructing large-scale urban point cloud dataset and extracting building instance, the present embodiment provides an apparatus for constructing large-scale urban point cloud dataset and extracting building instance, as shown in FIG. 9, the apparatus includes:

A feature extraction module 100, configured to obtain a point cloud feature corresponding to a target point cloud:

A collection module 200, configured to determine a foreground semantic map, an instance perception feature, and a center offset vector corresponding to the target point cloud based on the point cloud feature:

A building candidate generation module 300, configured to select a plurality of building candidate points from building foreground points in the foreground semantic map: based on the instance perception feature and the center offset vector, determine a relational matrix between the building foreground points and the building candidate points: determine instance tags of each building foreground point based on the relational matrix, and merge the instance tags to obtain a result of candidate building instance:

A building score prediction module 400, configured to score the result of the candidate building instance, and determining a result of building instance based on the scoring step.

Based on the above-mentioned method for constructing large-scale urban point cloud dataset and extracting building instance, the present embodiment provides a computer-readable storage medium, the computer-readable storage medium stores one or more programs, and the one or more programs may be executed by one or more processors, so as to implement the steps in the method for constructing the large-scale urban point cloud dataset and extracting building instance described in the above-mentioned embodiments.

Figure 10:
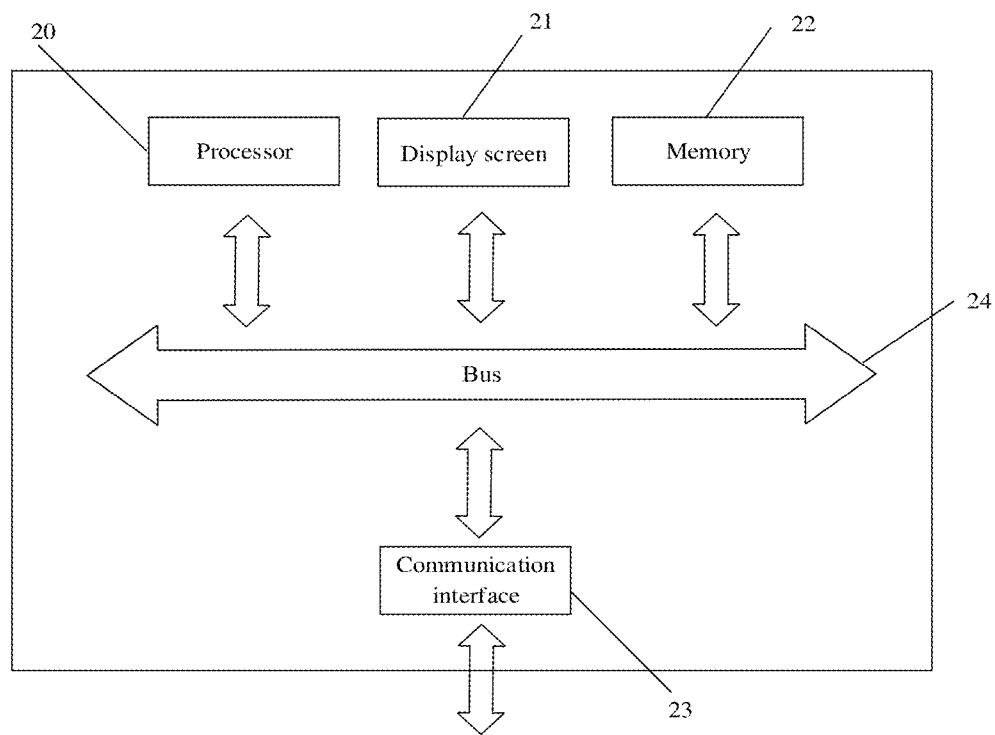
FIG. 10 is a schematic diagram of a structure of a terminal device provided by the present disclosure.

Based on the above-mentioned method for constructing large-scale urban point cloud dataset and extracting building instance, the present embodiment provides a terminal device, as shown in FIG. 10, the terminal device includes at least one processor 20, a display screen 21, and a memory 22. The terminal device may also include a communication interface 23, and a bus 24. Among them, the processor 20, the display screen 21, the memory 22, and the communication interface 23 can communicate with each other through the bus 24. The display screen 21 is configured to display a preset user guidance interface in an initial setting mode. The communication interface 23 can transmit information. The processor 20 can invoke a logic instruction in the memory 22 to execute the methods in the above-mentioned embodiments.

In addition, the above-mentioned logic instruction in the memory 22 may be implemented in a form of a software functional unit, and when the logic instruction is sold or used as an independent product, the logic instruction may be stored in one computer-readable storage medium.

As one type of computer-readable storage medium, the memory 22 may be configured to store a software program or a computer-executable program, such as a program, an instruction, or a module corresponding to the methods in the embodiments of the present disclosure. The processor 20 runs the software program, the instruction, or the module stored in the memory 22, so as to execute function applying and data processing, i.e. to implement the methods in the above-mentioned embodiments.

The memory 22 may include a program storage area and a data storage area. Among them, the program storage area may store an operating system and/or at least one application program required by a function; the data storage area may store data created according to a use of the terminal device, etc. In addition, the memory 22 may include a high-speed random access memory, and may also include a non-volatile memory. the memory 22 may include medium that can store program codes, for example, U disk, mobile hard disk, read-only memory (ROM), random access memory (RAM), magnetic disk, optical disk, etc. The memory 22 may also include transient-state storage medium.

In addition, the above-mentioned specific process of loading and executing multiple instructions in the storage medium and the terminal device by the processor is described in detail in the above-mentioned methods, and is not described here again.

Finally, it should be noted that, the above embodiments are only used to illustrate the technical solutions of the present disclosure, instead of limit them. Although the present disclosure is described in detail with reference to the above-mentioned embodiments, those skilled in the art should understand that, modifications can be made to the technical solutions described in the above-mentioned embodiments, or equivalent replacements can be made to some of the technical features. All these modifications or replacements do not make the essence of the corresponding technical solutions deviate from the spirit and scope of the technical solutions of the embodiments of the present disclosure.

What is claimed is:

1. A method for constructing large-scale urban point cloud dataset and extracting building instance, the method comprising steps of:
    obtaining a point cloud feature corresponding to a target point cloud;
    determining a foreground semantic map, an instance perception feature, and a center offset vector based on the point cloud feature, wherein the foreground semantic map, the instance perception feature, and the center offset vector correspond to the target point cloud;
    selecting a plurality of building candidate points from building foreground points in the foreground semantic map, determining a relational matrix between the building foreground points and the building candidate points based on the instance perception feature and the center offset vector, determining an instance tag of each building foreground point based on the relational matrix, and merging the instance tag to obtain a result of a building candidate instance; and
    scoring the result of the building candidate instance, and determining a result of a building instance based on the scoring.

2. The method according to claim 1, wherein the step of determining the relational matrix between the building foreground points and the building candidate points based on the instance perception feature and the center offset vector comprises further steps of:

determining a target instance perception feature and a center offset feature of each building foreground point based on the instance perception feature and the center offset vector, and determining a foreground feature of each building foreground point based on the target instance perception feature and the center offset feature of each building foreground point; and calculating a feature distance between each building foreground point and each building candidate point based on the foreground feature of each building foreground point, and forming the relational matrix based on the calculated feature distance.

3. The method according to claim 1, wherein a first quantity of the plurality of the building candidate points is determined based on a second quantity of the building foreground points, and the first quantity is less than the second quantity.

4. The method according to claim 1, wherein the step of merging the instance tag to obtain the result of the building candidate instance comprises further steps of:

adjusting a location information of each building candidate point based on the center offset vector to obtain a target location information of each building candidate point;

calculating a building distance between any two building candidate points in the plurality of the building candidate points based on the target location information of each building candidate point, and merging the plurality of the building candidate points based on the building distance to obtain a building target pointset; and mapping the instance tag of each building foreground point to a target instance tag set corresponding to the building target pointset to obtain the result of the building candidate instance.

5. The method according to claim 1, further comprising applying a trained building point cloud instance extraction network model, wherein:

the network model comprises a feature extraction module, a semantic branch, an instance perception branch, a center offset branch, a building candidate generation module, and a building score prediction module;

the semantic branch, the instance perception branch, and the center offset branch are concurrent;

the feature extraction module is connected with the semantic branch, the instance perception branch, and the center offset branch;

the semantic branch, the instance perception branch, and the center offset branch are all connected with the building candidate generation module;

the building candidate generation module is connected with the building score prediction module; and the building candidate generation module comprises a building candidate point selecting unit, a building grouping unit, and a building merging unit.

6. The method according to claim 5, wherein:

a large-scale urban point cloud dataset corresponding to the building point cloud instance extraction network model comprises a plurality of large-scale urban point clouds; and each three-dimensional point in each large-scale urban point cloud comprises 9 dimensions of three spatial coordinates, three color values, a semantic category, an instance number, and a building subclassification category.

7. The method according to claim 6, wherein:

the semantic category comprises a ground category, a vegetation category, a water surface category, a car category, a ship category, a bridge category, and a building category; and the building subclassification category comprises a commercial building category, a residential building category, an office building category, a cultural building category, a transportation building category, a municipal building category, and a temporary building category.

8. A non-transitory computer-readable storage medium, wherein the non-transitory computer-readable storage medium stores one or more programs, and the one or more programs may be executed by one or more processors to implement the steps in the method for constructing large-scale urban point cloud dataset and extracting building instance according to claim 1.

* * * * *